2,946,792

NEW PHENAZINE DERIVATIVES

Vincent C. Barry, Rathgar, Dublin, James G. Belton, Terenure, Dublin, Michael L. Conalty, Dublin, Dermot Twomey, Terenure, Dublin, and John F. O'Sullivan, Ranelagh, Dublin, Ireland, and Ernst Hodel, Basel, Switzerland, assignors to Geigy Chemical Corporation, New York, N.Y., a corporation of Delaware No Drawing. Filed Sept. 30, 1957, Ser. No. 686,823

Claims priority, application Switzerland Oct. 4, 1956

6 Claims. (Cl. 260—267)

The present invention concerns a process for the production of new phenazine derivatives as well as compounds produced thereby which have valuable chemotherapeutic and, in particular, tuberculostatic properties.

It is known that 2-anilino-3-imino-5-phenyl-3,5-dihydrophenazine (anilinoaposafranine), obtained by oxidising N-phenyl-o-phenylendiamine hydrochloride with ferric chloride, has tuberculostatic activity, see Nature 162, 622–623 (1948).

Surprisingly, it has now been found that 2-arylamino-3-arylimino-5-aryl-3,5-dihydro-phenazines of the general formula:

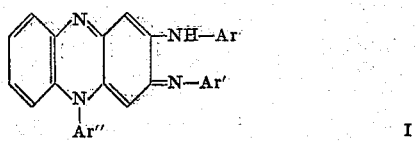

wherein two of the three symbols Ar, Ar' and Ar'' represent phenyl radicals or the same lower alkoxyphenyl radicals, and the third symbol represents a lower alkoxyphenyl radical, have a considerably stronger tuberculostatic activity than the phenazine derivatives which have previously been described. In addition, in pharmacological trials, these compounds differ from known tuberculostatics in that, for example, mice infected with turbercle bacilli continue to live for a long time after the treatment has stopped.

Compounds of the general formula defined above are produced in a simple manner from 2-arylamino-3-imino-5-aryl-3,5-dihydrophenazines or the isomeric 2-amino-3-arylimino-5-aryl-3,5-dihydrophenazines by heating a salt of such a compound corresponding to one of the two general formulas:

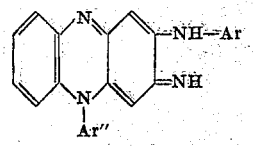

or

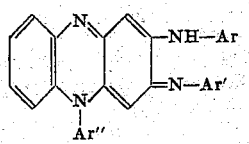

with an arylamine of the general formula:

 IV or

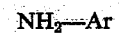 V wherein Ar, Ar' and Ar'' have the meaning given above, the reaction components being so chosen that at least either the aryl radicals of the phenazine derivatives or the aryl radical of the arylamine is a lower alkoxyphenyl radical.

Starting materials of the general Formula II having substituted aryl radicals Ar and Ar'' are obtained analogously to the known anilinoaposafranine by oxidising N-phenyl-o-phenylendiamine, wherein the phenyl radical is substituted by alkoxy groups, with ferric chloride. In the compounds so obtained, the radicals Ar and Ar'' are identical. Apart from the compound named above, suitable starting materials are e.g. 2-(p-anisidino)-3-imino-5-(p'-anisyl)-3,5-dihydro-phenazine and 2-(p-isopropoxy - phenyl)-3-imino-5-(p'-isopropoxy-phenyl)-3,5-dihydro-phenazine.

Isomeric starting materials of the general Formula III are obtained by oxidising salts of N-phenyl-o-phenylendiamine or N-phenyl-o-phenylendiamines in which the phenyl radical is substituted by alkoxy groups, with benzoquinone instead of with ferric chloride. Compounds are obtained in which Ar' and Ar'' are identical. Examples of starting materials of the general Formula III are 2-amino-3-phenylimino-5-phenyl-3,5-dihydro-phenazine; 2 - amino-3-(o-anisylimino)-5-(o'-anisyl)-3,5-dihydro-phenazine; 2-amino-3-(p-anisylimino)-5-(p'-anisyl)-3,5-dihydro-phenazine; 2 - amino-3-(p-phenetylimino)-5-(p'-phenetyl)-3,5-dihydro-phenazine; and 2-amino-3-(p-isopropoxy-phenylimino)-5-(p' - isopropoxy-phenyl)-3,5-dihydro-phenazine. In the form of their salts, in particular the hydrochlorides, these compounds can be reacted, for example, with arylamines of the general Formulae IV and V such as aniline, o-, m- and p-anisidine, p-phenetidine, p-n-propoxy aniline, p-isopropoxy aniline and p-n-hexyloxy aniline.

In the reaction of compounds of the general Formula II and in particular of those of the general Formula III, according to the type of substituents in the aryl radicals, it is sometimes difficult to avoid mixtures being obtained which, as well as the desired end product obtained by replacement of the unsubstituted imino or amino group by an arylimino group or an arylamino group, also contain a side product having identical radicals Ar and Ar'. This side product is the result of an additional replacement of the arylamino or arylimino group by a new arylamino or arylimino group. In the production of compounds in which all three aryl radicals are identical, the obtention of the side product named has naturally no influence on the purity of the desired end product as it is identical to it. In the production of compounds of the general Formula I having three identical aryl radicals, it is also possible to use mixtures of starting materials of the general Formula II or III instead of the pure starting materials themselves. Such mixtures are obtained as crude products on oxidising with ferric chloride as in the oxidation with p-benzoquinone. In the former case, compounds of the general Formula II are preponderant and in the latter case those of the general Formula III are preponderant.

Compounds in which Ar and Ar' are identical and Ar'', if desired, is another radical, are obtained if a mixture of brenzcatechin and an arylamine of the general Formula V defined above is reacted, advantageously in molar ratio of 1:2 and in the homogenous phase, with an alkali iodate and the condensation product obtained either in this most advantageous manner or in another manner, which is a 2-hydroxy-5-arylamino-1,4-benzoquinone-4-arylimine or its tautomer 4,5-diarylamino-1,2-benzoquinone corresponding to one of the two tautomeric formulae:

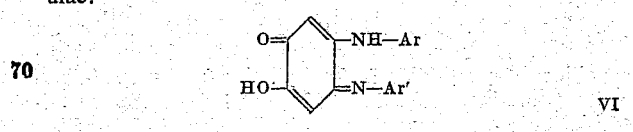

or

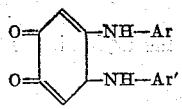

is reacted with a salt of an N-aryl-o-phenylendiamine of the general formula:

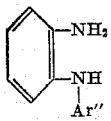

wherein Ar and Ar″ have the meaning given above, the reaction components being so chosen that at least either the aryl radical of the arylamine and, consequently, the aryl radicals of the intermediate product, or the N-aryl radical of the N-aryl-o-phenylendiamine is a lower alkoxyphenyl radical.

To condense the brenzcatechin oxidatively with an arylamine, both reaction components for example can be dissolved in an organic solvent which is miscible with water such as alcohol or acetone and then an aqueous solution of sodium iodate is added while stirring at room temperature.

Alkali iodates are surprisingly by far the most suitable oxidising agents and enable yields of 90–95% to be obtained whereas for example silver oxide or lead oxide are far less suitable oxidising agents. The 2-hydroxy-5-arylimino-1.4-benzoquinone-4-arylimines or 4.5-diarylamino-1.2-benzoquinones can be condensed with a salt of N-phenyl-o-phenylendiamine, substituted if desired a lower alkoxy group, by heating the components at moderately high temperatures, e.g. by boiling in alcohol. Suitable starting materials of the general Formula V have already been mentioned above, as starting materials of the general Formula VIII, e.g. N-phenyl-o-phenylendiamine, N-(4-methoxy-phenyl)-, N-(4-ethoxy-phenyl)- and N-(4-isopropoxy-phenyl)- o-phenylendiamine can be used.

The following examples further illustrate the production of the new compounds. Parts are given as parts by weight and their relationship to parts by volume is as that of grammes to cubic centimetres. The temperatures are in degrees centigrade.

*Example 1*

2.2 parts of brenzcatechin and 5.1 parts of p-chloraniline are dissolved in 100 parts by volume of ethanol and a solution of 4.0 parts of sodium iodate in 100 parts of water is added while stirring. The mixture is stirred at room temperature for three hours. The brilliant red precipitate is filtered off and washed first with water and then with a little methanol. It is not necessary to further purify the 2-hydroxy-5-(p-chloro-anilino)-1.4-benzoquinone-4-(p′-chloro-phenylimine) so obtained before the next step. The yield is 90–95%.

The reaction product obtained above is dissolved with 4.0 parts of N-phenyl-o-phenylendiamine hydrochloride in hot alcohol and the solution is refluxed for 3 hours. After making the reaction mixture alkaline, the basic condensation product is precipitated by the addition of water, filtered off, washed with water and dried. To further purify, the crude product in benzene solution is chromatographed through an aluminium column and crystallised from benzene, benzene/petroleum ether or alcohol. The 2-(p-chloro-anilino)-3-(p′-chloro-phenylimino)-5-phenyl-3.5-dihydro-phenazine obtained melts at 241–242°.

If in the first step, 4.9 parts of p-anisidine or 6.1 parts of p-n-propoxy aniline are used instead of the p-chloraniline, 2-p-anisidino-3-p′-anisylimino-5-phenyl-3.5-dihydro-phenazine (M.P. 218–219°) or 2-(p-n-propoxy-anilino)-3-(p′-n-propoxy-phenylimino)-5-phenyl - 3.5 - dihydro-phenazine (M.P. 204–206°) are obtained in the same manner.

*Example 2*

22 parts of brenzcatechin and 37.2 parts of aniline are dissolved in 900 parts by volume of alcohol and a solution of 40 parts of sodium iodate in 900 parts of water is poured at 20–25° within 25 minutes while stirring. After stirring for 6 hours at room temperature, the red reaction product which precipitates is filtered off under suction, washed with 1500 parts of water and then washed three times with 50 parts by volume of methanol each time. The 4.5-dianilino-1.2-benzoquinone so obtained melts at 185–190°. It is of sufficient purity for the next step.

21.8 parts of this product and 19.1 parts of N-(4-chloro-phenyl)-o-phenylendiamine hydrochloride are suspended in 1600 parts by volume of hot alcohol and the mixture is refluxed for 6 hours. It is then cooled to 65–70°, 30 parts of concentrated ammonia are then added within 45 minutes and the whole is stirred for another hour at this temperature. After cooling, the crude condensation product is filtered off under suction, washed with 500 parts by volume of water, dried, and crystallised from a mixture of benzene and petroleum ether. 2-anilino-3-phenylimino-5-(p-chloro-phenyl) - 3.5 - dihydro-phenazine is obtained as dark red crystals which melt at 205–206°.

If, in the first step, the aniline is replaced by 77.2 parts of p-n-hexyloxy aniline, 2-(p-n-hexyloxy-anilino)-3-(p′-n-hexyloxy-phenylimino)-5-(p″-chloro-phenyl - 3.5 - dihydro-phenazine (M.P. 182–183°) is obtained in an analogous manner.

*Example 3*

23 parts of 2-(p-chloro-anilino)-3-imino-5-(p′-chloro-phenyl)-3.5-dihydro-phenazine hydrochloride and 100 parts of p-chloroaniline are heated for half an hour at an inner temperature of 190–195° while stirring. The reaction mixture is then poured out hot and left to solidify, then broken up and washed out with ether until all the aniline has been removed. The reaction mixture can also be poured into diluted hydrochloric acid and the blue-black precipitate can be washed out with water until no more aniline can be traced. The blue-black powder obtained is then pasted with 300 parts of water and 300 parts of alcohol, 30 parts of concentrated ammonia are added within 45 minutes at 65–70° while stirring and the whole is stirred for another hour at this temperature. The liberated base is filtered off under suction, washed with water, dried and extracted in the Soxhlet apparatus with benzene. A side product which is insoluble in benzene remains. The benzene solution is concentrated to about 50 parts by volume and 100 parts by volume of petroleum ether are added. The base which precipitates is dissolved hot in a great deal of ethoxy ethanol and the solution is filtered hot. On cooling, the 2-(p-chloro-anilino)-3-(p′-chloro-phenylimino)-5 - (p″-chloro - phenyl)-3.5-dihydro-phenazine crystallises in red brown crystals which melt at 273–275°.

From the corresponding 2-arylamino-3-imino-5-aryl-3.5-dihydro-phenazines with the corresponding arylamines, 2-p-anisidino-3-(p′-anisylimino)-5-(p″-anisyl)-3.5-dihydro-phenazine (M.P. 219–221°) is obtained in an analogous manner.

The new phenazine derivatives according to the present invention can be used for the peroral treatment of tuberculous diseases in doses of about 1–3 mg. per kg. weight of the patient. Particularly advantageous is the combination of such phenazine derivatives with other tuberculostatics which are administered per os for the purpose of preventing or retarding the development of tubercle strains which are resistant to medicaments and the relapses caused thereby. Such combinations can contain for example 15 mg. of 2-anilino-3-phenylimino-5-(p-chloro-phenyl)-3.5-dihydro-phenazine or 2-p-chloro-anilino-3-

(p-chloro-phenylimino)-5-phenyl-3.5-dihydro-phenazine or 2-(p-chloro-anilino)-3-(p'-chloro-phenylimino)-5-(p''-chloro-phenyl)-3.5-dihydro-phenazine and 45 mg. of isonicotinic acid hydrazide per tablet or dragée. About 6–8 of such tablets are administered to adults daily which corresponds to one tablet per 10 kg. body weight.

What we claim is:

1. Phenazine derivatives of the general formula:

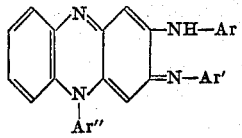

wherein two of the symbols Ar, Ar' and A'' represent the same aryl radicals selected from the group consisting of phenyl and lower alkoxyphenyl, and the third symbol represents lower alkoxyphenyl.

2. Process for the production of phenazine derivatives of the formula:

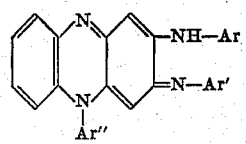

wherein Ar and Ar'' represent the same aryl radicals selected from the group consisting of phenyl and lower alkoxyphenyl and Ar' represents lower alkoxyphenyl, comprising heating to substantially about 190° a salt of a compound of the formula:

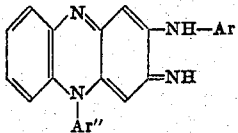

with an amine of the general formula:

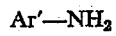

Ar'—NH₂

3. Process for the production of phenazine derivatives of the general formula:

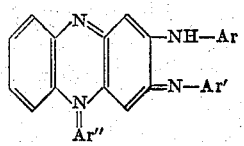

wherein Ar and Ar'' represent the same lower alkoxyphenyl, and Ar' represents lower alkoxyphenyl, comprising heating to substantially about 190° a salt of a compound of the formula:

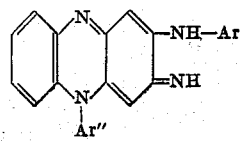

with an amine of the formula:

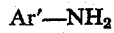

Ar'—NH₂

4. 2-(p-anisidino)-3-(p'-anisylimino)-5-phenyl-3,5-dihydrophenazine.

5. 2 - (p - n - propoxy-anilino)-3-(p'-n-propoxy-phenylimino)-5-phenyl-3,5-dihydro-phenazine.

6. 2-(p-anisidino)-3-(p'-anisylimino)-5-(p''-anisyl)-3,5-dihydro-phenazine.

References Cited in the file of this patent

Barry et al.: Jour. Chem. Soc. (London), 1956, pp. 893–5.

Chemical Reviews, vol. 35, p. 389 (1944).

Kehrmann: Berichte der Deutsche Chem. Gesell, vol. 56, pp. 2394–2395 (1923).